Nov. 25, 1958          D. D. PHELPS          2,861,881
METHOD OF FRITTING FERROMANGANESE FLUE DUST
Filed Oct. 26, 1955
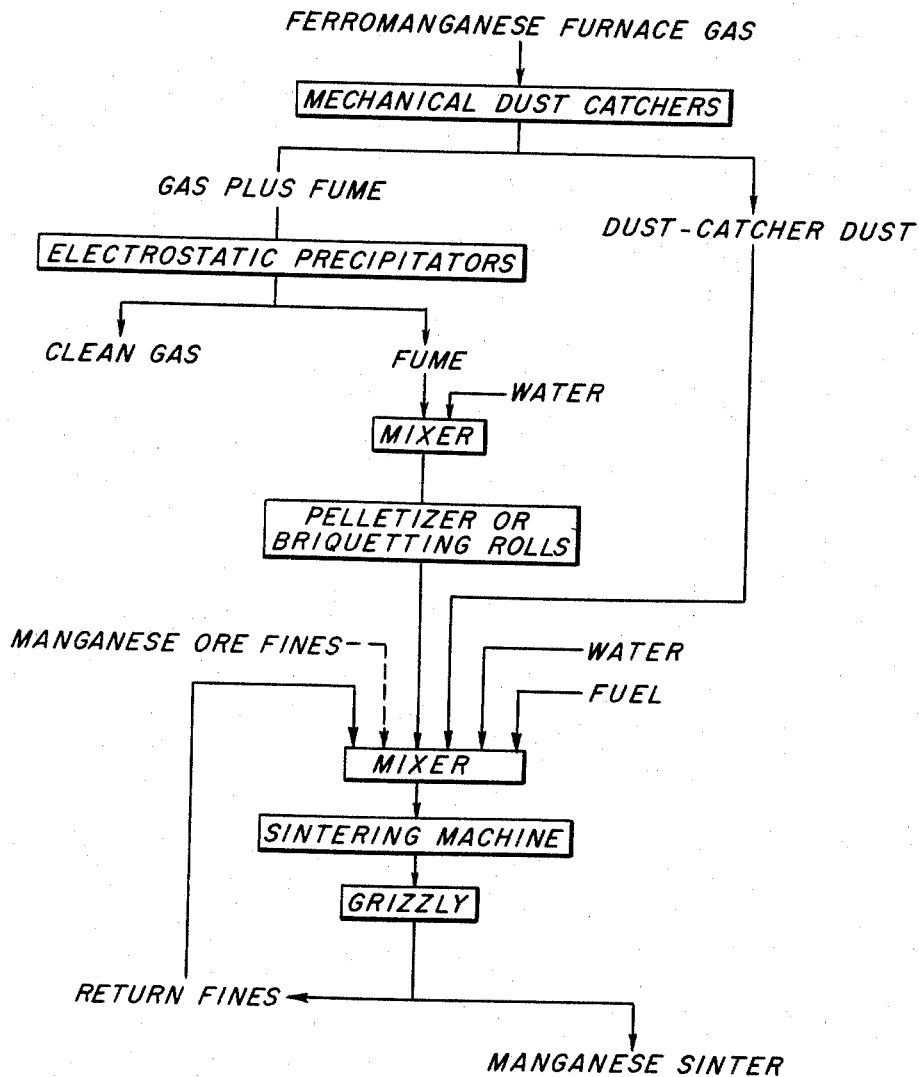
INVENTOR:
DONALD D. PHELPS,
BY: *Donald G. Dalton*
his Attorney.

United States Patent Office 2,861,881
Patented Nov. 25, 1958

2,861,881
METHOD OF FRITTING FERROMANGANESE FLUE DUST

Donald D. Phelps, Monroeville, Pa., assignor to United States Steel Corporation, a corporation of New Jersey Application October 26, 1955, Serial No. 542,959

1 Claim. (Cl. 75—25)

This invention relates to an improved method of fritting ferromanganese flue dust. As used herein, the term "fritting" refers to any agglomerating procedure which involves partial fusion of the material, including sintering, nodulizing and pelletizing.

In the operation of a ferromanganese blast furnace, mechanical dust catchers collect relatively coarse dust from the flue gases, while precipitators collect finer dust. As used herein, the term "pricipitator" includes any device capable of collecting exceedingly fine dust particles, such as an electrostatic pricipitator or a venturi scrubber. "Dust catcher dust" consists mainly of minus 20 mesh particles of coke, manganese ore, and limestone blown from the furnace by the rising gas column. This dust can be sintered or otherwise fritted for re-use in the furnace by known procedures. "Precipitator dust" consists largely of minus 1-micron particles produced by volatilization of manganese ore and slag in the hot zones of the furnace below the stock column. The latter dust is too fine for collection in mechanical catchers or for fritting by ordinary procedures, although methods are known for briquetting it (e. g. Francis et al. Patent No. 2,277,663). The difficulty in fritting is in producing a mix sufficiently permeable to passage of air through the material without excessive loss of dust to the windlegs of the equipment. Unfritted briquettes lose strength on heating and do not make an acceptable blast furnace charge material.

An object of the present invention is to provide a practical fritting method which enables precipitator dust, as well as dust catcher dust to be fritted for re-use in a blast furnace.

A further object is to provide an improved method of fritting a mixture of ferromanganese dust catcher dust and precipitator dust and optionally ore fines in a single operation.

The single figure of the drawing is a schematic flow sheet of a preferred mode of practicing my improved method. As indicated therein, gas from a ferromanganese blast furnace passes first through mechanical dust catchers and thence through an electrostatic precipitator or the equivalent. The precipitator dust or fume is moistened, mixed and agglomerated (e. g. pelletized or briquetted). Dust catcher dust, agglomerated precipitator dust, return fines from the subsequent fritting machine, fuel and optionally manganese ore fines are moistened and mixed to form a feed. This feed is introduced to a sintering machine or equivalent fritting means and fritted. If desired, the feed can be reagglomerated before fritting, this second agglomerating step being necessary for fritting by means other than sintering. The feed has sufficient permeability to produce a strong fritted product without excessive losses. The fritted product is screened over a grizzly or the like and the undersize returned to the feed mixer. The oversize constitutes a finished fritted product suitable for charging to a ferromanganese blast furnace. The individual pieces of equipment per se, such as the dust catchers, precipitators, mixers, pelletizer and sintering machine, can be of any standard or desired type and are operated in the usual manner. Hence no detailed description is deemed necessary.

The novel feature of my invention is in combining agglomerated precipitator dust with dust catcher dust, ore fines or both to produce a feed for the fritting means. The proportions by weight of ingredients in the feed can be within the following ranges on a dry basis:

|  | Percent |
| --- | --- |
| Precipitator dust | up to 50 |
| Dust catcher dust and ore fines | 15 to 75 |
| Sinter returns | 25 to 35 |
| Carbonaceous fuel | 5 to 7 |

There is sufficient flexibility in the proportions to utilize all the dust recovered from a furnace and to admix a substantial quantity of ore fines if available. An equivalent fritted product could be produced without dust catcher dust altogether, but containing 15 to 75 percent ore fines, although in practice the usual objective is to utilize all the dust recovered from a furnace. For example, I have produced a strong fritted product from a mix containing two parts by weight precipitator dust to one of dust catcher dust, which is the typical proportion in which these products are recovered. To this can be added up to nine parts by weight of ore fines. The moisture added is sufficient to produce a water content of 16 to 18 percent by weight based on the total weight of feed.

While I have described a preferred way of practicing the invention, it is apparent modifications may arise. Therefore I do not wish to be limited by this disclosure, but only by the scope of the appended claim.

I claim:

A method of reclaiming ferromanganese blast furnace flue dust, which includes both particles blown from a ferromanganese blast furnace by a rising gas column and particles produced by volatilization of manganese ore and slag in the hot zones of the furnace, which method comprises recovering a coarse dust product by mechanical means, recovering a finer dust product consisting largely of minus 1-micron particles with a precipitator, moistening and agglomerating said finer dust product, forming a permeable feed by mixing together said coarse dust product, said agglomerated fine dust product, returns from a fritting operation, carbonaceous fuel and water, the proportions by weight on a dry basis in said feed being as follows:

|  | Percent |
| --- | --- |
| Coarse dust product | 15 to 75 |
| Finer dust product | up to 50 |
| Returns | 25 to 35 |
| Fuel | 5 to 7 | the moisture content being 16 to 18 percent by weight of the total weight of feed, and fritting said feed to form a fritted product for re-use in charging to a blast furnace.

References Cited in the file of this patent

UNITED STATES PATENTS

| 2,173,535 | Francis | Sept. 19, 1939 |
| 2,277,663 | Francis et al. | Mar. 31, 1942 |
| 2,373,244 | Holz | Apr. 10, 1945 |
| 2,412,104 | Stewart | Dec. 3, 1946 |
| 2,631,178 | Morton | Mar. 10, 1953 |
| 2,768,890 | Cover | Oct. 30, 1956 |

FOREIGN PATENTS

| 229,608 | Great Britain | Feb. 26, 1925 |
| 621,661 | Great Britain | Apr. 13, 1949 |